Patented Sept. 27, 1949

2,483,259

UNITED STATES PATENT OFFICE 2,483,259

LUSTERLESS WAX EMULSIONS AND METHOD OF PREPARATION

Anton E. Budner, Alfred F. Buckman, Jr., and Edward Spurgat, Racine, Wis., assignors to S. C. Johnson & Son, Inc., Racine, Wis.

No Drawing. Application December 6, 1946, Serial No. 714,656

13 Claims. (Cl. 106—245)

This invention relates to lustreless wax emulsions and method of preparation. More particularly, it relates to aqueous wax emulsions wherein specific delustring agents are incorporated in order to decrease the amount of lustre or gloss, and method of their preparation.

It has long been common practice to apply wax in emulsion form as a protective surface coating in a large variety of applications. When a vegetable wax such as carnauba is incorporated in the emulsion, the wax gives a glossy coating merely upon drying with little or no rubbing or brushing of the dried coat. For many years research efforts have been directed toward improving this lustre or gloss by varying the wax content, including a natural or synthetic resin, and by careful selection of the emulsifying agent.

While the obtaining of a high degree of lustre or gloss is still zealously pursued, there are a variety of products in which the protective properties of a surface coating of wax are highly desirable, but the lustre or gloss associated with the wax coating is objectionable.

For example, recent tests have shown the advantages of treating bananas with an aqueous wax emulsion as a preservative. However, the lustre or gloss on the surface of the bananas was objectionable since consumers were unaccustomed to the surface of bananas having a lustre or gloss.

In further illustration, there recently has been developed an improved method of treating rubber goods with an aqueous wax emulsion, but the lustre or gloss was objectionable. In this industry a dull or lustreless finish is desired, but it is essential that the protective properties of the wax coating not be sacrificed.

In accordance with this invention, there has been discovered a method for delustring an aqueous wax emulsion which comprises adding to the emulsifiable solids before emulsifying from about 1% to about 40% by weight of a delustring agent selected from the group consisting of stearyl alcohol and hydrogenated castor oil.

Thus, there has been prepared a lustreless aqueous wax emulsion comprising emulsifiable solids, emulsifying agent, water and from about 1% to about 40% by weight of the emulsifiable solids of a delustring agent selected from the group consisting of stearyl alcohol and hydrogenated castor oil.

In addition specific compositions have been prepared for use in treating bananas and rubber goods. These compositions will hereinafter be discussed in detail.

Now, having indicated in a general way, the nature and purpose of our invention, the following examples will illustrate the invention. It is to be understood, however, that such examples are presented merely as illustrations of the invention and are not to be construed as limiting the same. In the examples, the ingredients are given in parts by weight, unless otherwise indicated.

Example 1

An aqueous wax emulsion was prepared by melting 12 parts aluminum stearate, 25.42 parts carnauba wax, 15.9 parts high melting (185° F.–195° F.) microcrystalline paraffin wax and 10.6 parts soya fatty acid in a suitable vessel by heating to about 220° F.–240° F. until the aluminum stearate was dissolved. When the mixture had cooled to about 200° F., 5 parts morpholine was added. The temperature was maintained at about 200° F. and water was slowly added at a rate so as to maintain a translucent gel during the time the gel continued to absorb the water. The slow addition of water is continued until the gel breaks. The emulsion was then diluted with sufficient water to bring the total water content to 510 parts. A shellac solution was prepared by mixing 681 parts refined, wax-free shellac, with 90 parts morpholine and 3860 parts of water. There was then added 578 parts of the shellac solution to the aqueous wax emulsion with stirring.

The thus prepared emulsion was diluted with an equal part of water and was then sprayed in a fine spray on untreated rubber footwear. After allowing to dry for about 15 minutes the uncured rubber was cured by placing in a hot air oven maintained at from 225° F. to about 275° F. for a period of about 1½ hours. The resulting wax coating on the cured rubber was excellent as a protective coating, and had the desired non-tacky feel, but possessed an objectionable gloss or lustre.

Example 2

This experiment was repeated except that the paraffin wax was reduced from 15.9 to 10.9 parts and 5 parts hydrogenated castor oil was added to the wax base. The resulting wax coating on the cured rubber footwear was equivalent to that of Example 1 in all respects, except the gloss or lustre had been killed and the finished product possessed a dull, but not flat lustreless appearance which met the requirements of the rubber footwear manufacturer in all respects as a replacement for the lacquer coating.

Example 3

Example 2 was repeated, except that stearyl alcohol was used in place of hydrogenated castor oil. The stearyl alcohol functioned substantially as an equivalent of hydrogenated castor oil as a delustring agent.

*Example 4*

An excellent coating for preserving bananas was prepared by melting 38.3 parts of carnauba wax, 2.5 parts of hydrogenated castor oil, 28.8 parts of low melting (155° F.–165° F.) microcrystalline paraffin wax in a suitable vessel by heating to about 200° F. There was then added 12 parts oleic acid, followed by 5 parts morpholine. The temperature was maintained at about 200° F. and water was slowly added at a rate so as to maintain a translucent gel during the time the gel continued to absorb the water. The addition of water is continued at this rate until the gel breaks. The emulsion was then diluted with sufficient water to bring the total water content to 586.5 parts. Then 60 parts shellac solution, prepared as in Example 1, was added to the aqueous wax emulsion with stirring.

The bananas were then treated by spraying. The resulting coating was an excellent preservative and protective coating for the bananas, but the coating did not destroy the natural appearance of the bananas by imparting gloss or lustre.

While in Example 2, an excellent composition for treating uncured rubber goods has been illustrated, the waxes and metal stearate may be varied within the following range.

|  | Per cent |
|---|---|
| Metal stearate may be aluminum, calcium, magnesium or zinc | 10–20 |
| Vegetable wax may be carnauba, candelilla, etc. | 25–60 |
| Paraffin wax may be microcrystalline, crystalline or ozokerite | 15–45 |
| Delustring agent may be hydrogenated castor oil or stearyl alcohol | 1–40 |

While all four materials are essential ingredients, it is thus obvious that the amounts may be varied over a wide range. All percentages are figured on the basis that the emulsifiable solids of each composition is composed of 100 parts.

While it may appear that the amount of delustring agent will vary over a large range, i. e. from about 1% to about 40%, it should be noted that these percentages are figured on the amount of delustring agent added to the emulsifiable solids prior to emulsification. It should also be noted that those type compositions which contain a high percentage of delustring agent are generally diluted substantially before use, thus actually reducing the percentage of delustring agent in the emulsion as applied. If more than 40% is added, difficulty will be experienced in preparing a stable emulsion.

The delustring agents operable within the confines of this invention are hydrogenated castor oil and stearyl alcohol. Both of these compounds are derivatives of a $C_{18}$ compound, one being an alcohol, and the other primarily the triglyceride ester.

While several examples of specific uses have been shown, it will be understood that they were shown by way of illustration only. It will be obvious that one skilled in the art by practicing this invention can produce a lustreless aqueous wax emulsion suitable for numerous other uses.

Examples 1 and 2 have been given to illustrate the different physical appearance obtained by the addition of the delustring agent of this invention. The addition of 5 parts of hydrogenated castor oil in Example 2 in substitution of 5 parts of paraffin dulled the lustre or gloss of the emulsion of Example 1 without affecting the protective properties or tackless feel of the coating.

The emulsion of Example 4 may also be varied over a wide range. Various emulsions known to the art as fruit and vegetable coatings may be used, provided the delustring agent is included as taught by this invention.

While soya fatty acid-morpholine, oleic acid-morpholine, have been shown as the emulsifying agent in the examples, this is not intended to be a limitation on the use of other wax emulsifying agents such as triethanolamine soap, polyether fatty ester condensate, and other non-ionic and anionic emulsifying agents.

Although carnauba wax has been used in all the examples, other waxes, resins and mixtures thereof may be used in toto or in part, except that in Example 2, at least 25% of the emulsifiable solids should be carnauba wax.

While temperatures varying from 200° F. to 220° F. – 240° F. have been used in the examples in preparing the emulsions, this temperature may be varied over a wide range as taught by the art.

While in Examples 1 through 4 a shellac solution has been shown, other natural resin solutions such as Manila gum and the like may be used as the equivalent of shellac solution. While specific instructions have been given in Example 1 for the preparation of the shellac solution, these proportions may be varied as is well known to the art.

Thus, in accordance with this invention, it is now possible to prepare a lustreless aqueous wax emulsion, or if desired, merely reduce the amount of lustre in an aqueous wax emulsion. The invention further teaches the manner of preparing lustreless aqueous wax emulsions suitable for use in a variety of new applications, such as treatment of uncured rubber goods, protective coatings for bananas, and other uses where a dull or lustreless appearance is desired.

Other modes of applying the principle of the invention may be employed instead of those explained change being made as regards the method and/or compositions herein disclosed, provided the step or steps stated or the compositions described in any of the following claims or the equivalent of such stated step or steps or compositions be employed.

We claim:

1. An aqueous wax emulsion for treating rubber stock consisting essentially of emulsifiable solids, water-soluble emulsifying agent, water and a natural resin solution in which the emulsifiable solids comprise from 10 to 20% by weight of a material selected from the group consisting of aluminum, calcium, magnesium and zinc stearate, from 25 to 60% of a vegetable wax, from 15 to 45% of paraffin and from 1 to 40% of a delustring agent selected from the group consisting of stearyl alcohol and hydrogenated castor oil, and water constituting the major portion of said emulsion.

2. An aqueous wax emulsion for treating rubber stock consisting essentially of emulsifiable solids, water-soluble emulsifying agent, water and a natural resin solution in which the emulsifiable solids comprise from 10 to 20% by weight of a material selected from the group consisting of aluminum, calcium, magnesium and zinc stearate, from 25 to 60% of a vegetable wax, from 15 to 45% of paraffin and from 1 to 40% of stearyl alcohol, and water constituting the major portion of said emulsion.

3. An aqueous wax emulsion for treating rubber stock consisting essentially of emulsifiable solids, water-soluble emulsifying agent, water and a natural resin solution in which the emulsifiable solids comprise from 10 to 20% by weight of a material selected from the group consisting of aluminum, calcium, magnesium and zinc stearate, from 25 to 60% of a vegetable wax, from 15 to 45% of paraffin and from 1 to 40% of hydrogenated castor oil, and water constituting the major portion of said emulsion.

4. An aqueous wax emulsion for treating rubber stock consisting essentially of emulsifiable solids, water-soluble emulsifying agent, water and a natural resin solution in which the emulsifiable solids comprise from 10 to 20% by weight of aluminum stearate, from 25 to 60% of carnauba wax, from 15 to 45% of paraffin and from 1 to 40% of stearyl alcohol, and water constituting the major portion of said emulsion.

5. An aqueous wax emulsion for treating rubber stock consisting essentially of emulsifiable solids, water-soluble emulsifying agent, water and a natural resin solution in which the emulsifiable solids comprise from 10 to 20% by weight of aluminum stearate, from 25 to 60% of carnauba wax, from 15 to 45% of paraffin and from 1 to 40% of hydrogenated castor oil, and water constituting the major portion of said emulsion.

6. An aqueous wax emulsion for treating rubber stock consisting essentially of emulsifiable solids, water-soluble emulsifying agent, water and a natural resin solution in which the emulsifiable solids consist of about 12 parts aluminum stearate, about 25 parts carnauba wax, about 11 parts microcrystalline paraffin, about 5 parts hydrogenated castor oil, and about 11 parts soy bean fatty acid, and water constituting the major portion of said emulsion.

7. An aqueous wax emulsion for treating rubber stock consisting essentially of emulsifiable solids, water-soluble emulsifying agent, water and a natural resin solution in which the emulsifiable solids consist of about 12 parts aluminum stearate, about 25 parts carnauba wax, about 11 parts microcrystalline paraffin, about 5 parts stearyl alcohol, and about 11 parts soy bean fatty acid and water constituting the major portion of said emulsion.

8. A method for delustring an aqueous wax emulsion having emulsifiable solids, water-soluble emulsifying agent, the major portion of water and a natural resin solution in which the emulsifiable solids comprise a material selected from the group consisting of aluminum, calcium, magnesium and zinc stearate, paraffin and from 25 to 60% vegetable wax, which method comprises including in said emulsifiable solids before emulsifying from 1 to 40% by weight of a delustring agent selected from the group consisting of stearyl alcohol and hydrogenated castor oil, said delustring agent remaining chemically inert.

9. A method for delustring an aqueous wax emulsion having emulsifiable solids, water-soluble emulsifying agent, the major portion of water and a natural resin solution in which the emulsifiable solids comprise a material selected from the group consisting of aluminum, calcium, magnesium and zinc stearate, paraffin and from 25 to 60% vegetable wax, which method comprises including in said emulsifiable solids before emulsifying from 1 to 40% by weight of stearyl alcohol, said stearyl alcohol remaining chemically inert.

10. A method for delustring an aqueous wax emulsion having emulsifiable solids, water-soluble emulsifying agent, the major portion of water and a natural resin solution in which the emulsifiable solids comprise a material selected from the group consisting of aluminum, calcium, magnesium and zinc stearate, paraffin and from 25 to 60% vegetable wax, which method comprises including in said emulsifiable solids before emulsifying from 1 to 40% by weight of hydrogenated castor oil, said hydrogenated castor oil remaining chemically inert.

11. A lustreless non-buffing type aqueous wax emulsion consisting essentially of emulsifiable solids, said solids comprising a material selected from the material consisting of aluminum, calcium, magnesium and zinc stearate, vegetable wax, paraffin wax and a delustring agent selected from the group consisting of stearyl alcohol and hydrogenated castor oil, said delustring agent constituting from about 1% to about 40% and said vegetable wax from 60% to 25% by weight of said emulsifiable solids, a water-soluble emulsifying agent and water constituting the major portion of said emulsion, said delustring agent remaining chemically inert in said emulsion.

12. A lustreless non-buffing type aqueous wax emulsion consisting essentially of emusifiable solids, said solids comprising a material selected from the material consisting of aluminum, calcium, magnesium and zinc stearate, vegetable wax, paraffin wax and stearyl alcohol, said stearyl alcohol constituting from about 1% to about 40% and said vegetable wax from 60% to 25% of said emulsifiable solids, a water-soluble emulsifying agent and water constituting the major portion of said emulsion, said stearyl alcohol remaining chemically inert in said emulsion.

13. A lustreless non-buffing type aqueous wax emulsion consisting essentially of emulsifiable solids, said solids comprising a material selected from the material consisting of aluminum, calcium, magnesium and zinc stearate, vegetable wax, paraffin wax and hydrogenated castor oil, said hydrogenated castor oil constituting from about 1% to about 40% and said vegetable wax from 60% to 25% by weight of said emulsifiable solids, a water-soluble emulsifying agent and water constituting the major portion of said emulsion, said hydrogenated castor oil remaining chemically inert in said emulsion.

ANTON E. BUDNER.
ALFRED F. BUCKMAN, Jr.
EDWARD SPURGAT.

REFERENCES CITED

The following references are of record in the file of this patent:

UNITED STATES PATENTS

| Number | Name | Date |
| --- | --- | --- |
| 1,390,691 | Ellis | Sept. 13, 1921 |
| 1,943,468 | Bridgeman et al. | Jan. 16, 1934 |
| 1,974,854 | Schrauth | Sept. 25, 1934 |
| 2,066,385 | Barthelemy | Jan. 5, 1937 |
| 2,126,096 | Deguide | Aug. 9, 1938 |
| 2,159,151 | Hersberger | May 23, 1939 |
| 2,187,858 | Kern | Jan. 23, 1940 |
| 2,246,085 | Arnold | June 17, 1941 |
| 2,369,992 | Treacy | Feb. 20, 1945 |